(12) United States Patent
Scott et al.

(10) Patent No.: US 8,438,469 B1
(45) Date of Patent: May 7, 2013

(54) EMBEDDED REVIEW AND RATING INFORMATION

(75) Inventors: James Kevin Scott, New York, NY (US); Jeff C. Reynar, New York, NY (US); Jeremy A. Hylton, Easton, PA (US); Kushal B. Dave, New York, NY (US)

(73) Assignee: Google Inc., Mountain View, CA (US)

( * ) Notice: Subject to any disclaimer, the term of this patent is extended or adjusted under 35 U.S.C. 154(b) by 1440 days.

(21) Appl. No.: 11/241,692

(22) Filed: Sep. 30, 2005

(51) Int. Cl.
*G06F 17/24* (2006.01)
*G06F 17/30* (2006.01)

(52) U.S. Cl.
USPC ........... 715/230; 715/231; 715/232; 715/243; 715/251; 715/253

(58) Field of Classification Search .......... 715/230–232, 715/243, 251, 253
See application file for complete search history.

(56) References Cited

U.S. PATENT DOCUMENTS

| | | | |
|---|---|---|---|
| 5,939,278 A | 8/1999 | Boon et al. | 435/7.23 |
| 6,064,980 A * | 5/2000 | Jacobi et al. | 705/26 |
| 6,236,990 B1 | 5/2001 | Geller et al. | 707/5 |
| 6,260,064 B1 * | 7/2001 | Kurzrok | 709/224 |
| 6,285,999 B1 | 9/2001 | Page | 707/5 |
| 6,598,026 B1 | 7/2003 | Ojha et al. | 705/26 |
| 6,718,324 B2 | 4/2004 | Edlund et al. | 707/5 |
| 6,807,566 B1 | 10/2004 | Bates et al. | 709/206 |
| 6,892,178 B1 | 5/2005 | Zacharia | 705/10 |
| 6,892,179 B1 | 5/2005 | Zacharia | 705/10 |
| 6,912,505 B2 * | 6/2005 | Linden et al. | 705/14 |
| 6,963,848 B1 * | 11/2005 | Brinkerhoff | 705/10 |
| 7,013,303 B2 | 3/2006 | Faybishenko et al. | 707/10 |
| 7,039,631 B1 | 5/2006 | Finger, II | 707/3 |
| 7,246,110 B1 | 7/2007 | Musgrove et al. | 707/3 |
| 7,302,429 B1 | 11/2007 | Wanker | 707/7 |
| 7,343,374 B2 | 3/2008 | Berkhin | 707/5 |
| 7,406,436 B1 | 7/2008 | Reisman | 705/10 |
| 7,428,496 B1 | 9/2008 | Keller et al. | 705/10 |
| 7,433,832 B1 | 10/2008 | Bezos et al. | 705/26 |

(Continued)

FOREIGN PATENT DOCUMENTS

EP 1834249 A2 9/2007
WO WO 2004/025516 A2 3/2004

OTHER PUBLICATIONS

Jacob Palme, "How to integrate the SELECT rating serice with other Web services?", publisher: www.sztaki.hu, May 2001, pp. A-1, A-2, B-1, B-2, http://web.archive.org/web/20010502234530/www.sztaki.hu/SELECT/integration.html.*

(Continued)

*Primary Examiner* — Stephen Hong
*Assistant Examiner* — Wilson Tsui
(74) *Attorney, Agent, or Firm* — Morgan, Lewis & Bockius LLP

(57) ABSTRACT

A method of embedding evaluations in a document is described. An identifier tag is embedded in the document in response to a first user action. The document may include a web page. The identifier tag includes a review and an identifier associated with an entity that is a subject of the review. A rating tag is embedded in the document in response to a second user action. The rating tag includes a rating value corresponding to a user-selected rating of the entity that is the subject of the review. The rating value may be selected from a set of pre-determined rating values.

25 Claims, 15 Drawing Sheets

U.S. PATENT DOCUMENTS

| | | | |
|---|---|---|---|
| 7,461,051 B2 | 12/2008 | Lavine | 707/3 |
| 7,467,206 B2 | 12/2008 | Moore et al. | 709/225 |
| 7,493,320 B2 | 2/2009 | Canright et al. | 707/5 |
| 7,519,562 B1 | 4/2009 | Vander Mey et al. | 705/500 |
| 7,620,651 B2 | 11/2009 | Chea et al. | 707/102 |
| 2002/0046203 A1 | 4/2002 | Siegel et al. | 707/1 |
| 2002/0073125 A1* | 6/2002 | Bier | 707/530 |
| 2002/0165905 A1 | 11/2002 | Wilson | 709/203 |
| 2002/0193066 A1 | 12/2002 | Connelly | 455/2.01 |
| 2004/0019611 A1 | 1/2004 | Pearse et al. | |
| 2004/0030525 A1 | 2/2004 | Robinson et al. | 702/127 |
| 2004/0117340 A1 | 6/2004 | Blitzer | 707/1 |
| 2004/0205065 A1 | 10/2004 | Petras et al. | 707/5 |
| 2004/0225577 A1 | 11/2004 | Robinson | 705/26 |
| 2004/0225672 A1* | 11/2004 | Landers et al. | 707/102 |
| 2004/0255237 A1 | 12/2004 | Tong | |
| 2005/0027685 A1 | 2/2005 | Kamvar et al. | 707/2 |
| 2005/0034071 A1 | 2/2005 | Musgrove et al. | 715/256 |
| 2005/0065811 A1 | 3/2005 | Chu et al. | 705/1 |
| 2005/0091038 A1 | 4/2005 | Yi et al. | 704/10 |
| 2005/0097188 A1 | 5/2005 | Fish | 709/217 |
| 2005/0131918 A1 | 6/2005 | Hillis et al. | 707/100 |
| 2005/0137939 A1* | 6/2005 | Calabria et al. | 705/26 |
| 2005/0216295 A1 | 9/2005 | Abrahamsohn | 705/321 |
| 2006/0064343 A1 | 3/2006 | Burke et al. | 705/10 |
| 2006/0129446 A1 | 6/2006 | Ruhl et al. | 705/10 |
| 2006/0143158 A1 | 6/2006 | Ruhl et al. | 707/3 |
| 2006/0277290 A1 | 12/2006 | Shank | 709/223 |
| 2006/0282762 A1* | 12/2006 | Diamond et al. | 715/511 |
| 2007/0033092 A1 | 2/2007 | Iams | 705/10 |
| 2007/0038620 A1 | 2/2007 | Ka et al. | 707/5 |
| 2007/0078669 A1 | 4/2007 | Dave et al. | 705/347 |
| 2007/0078670 A1 | 4/2007 | Dave et al. | 705/347 |
| 2007/0078699 A1 | 4/2007 | Scott et al. | 705/10 |
| 2007/0078845 A1 | 4/2007 | Scott et al. | 707/5 |
| 2007/0078851 A1 | 4/2007 | Grell et al. | 707/7 |
| 2007/0208613 A1 | 9/2007 | Backer | 705/10 |
| 2007/0294127 A1 | 12/2007 | Zivov | 705/10 |
| 2008/0015925 A1 | 1/2008 | Sundaresan | 705/10 |
| 2008/0120166 A1 | 5/2008 | Fernandez et al. | 705/10 |
| 2008/0256040 A1 | 10/2008 | Sundaresan et al. | 707/3 |

OTHER PUBLICATIONS

Kent Kurchak, "Notes application strategies: Document rating", published: Apr. 5, 2004, pp. 1-16.*

Kushal, D.B., et al., "Mining the Peanut Gallery: Opinion Extraction and Semantic Classification of Product Reviews", *WWW 2003*, May 20-24, 2003, Budapest, Hungary.

Hu, M.; et al., "Mining Opinion Features in Customer Reviews", *Proceedings of Nineteenth National Conference on Artificial Intelligence (AAAI-2004)*, Jul. 2004, San Jose, CA.

Nigam, K., et al., "Towards a Robust Metric of Opinion", *Proceedings of Nineteenth National Conference on Artificial Intelligence (AAAI-2004)*, Jul. 2004, San Jose, CA.

Yi, J., et al., "Sentiment Analyzer: Extracting Sentiments about a Given Topic using Natural Language Processing Techniques", *Proceedings of the Third IEEE International Conference on Data Mining*, 2003.

Hu, M., et al., "Mining and Summarizing Customer Reviews", *KDD '04*, Aug. 22-25, 2004, Seattle, WA.

Abonyi, et al., "Computational Intelligence in Data Mining," Informatica, An International Journal of Computing and Informatics, vol. 29, No. 1, May 2005, pp. 3-121.

Berkhin, "A Survey on PageRank Computing," Internet Mathematics, vol. 2, No. 1, pp. 73-120.

Borodin, "Link Analysis Ranking: Algorithms, Theory and Experiments," ACM Transactions on Internet Technology, vol. 5, No. 1, Feb. 2005, pp. 231-297.

Church et al., "Inverse document frequency (IDF): a measure of deviations from Poisson," AT&T Bell Laboratories, 1995, pp. 121-130.

Ding et al., "Link Analysis: Hubs and Authorities on the World Wide Web," LBNL Tech Report 47847, May 7, 2001, 12 pgs.

Ding et al., Link Analysis: Hubs and Authorities on the World Wide Web, SIAM Review, vol. 46, No. 2, 2004, 13 pgs.

O'Donovan et al., "Personalizing Trust in Online Auctions," Adaptive Information Cluster, School of Computer Science and Informatics, 2003, 12 pgs.

Furner, "On Recommending," Journal of the American Society for Information Science and Technology, 2002, pp. 1-27.

Gibson, "Communities and Reputation on the Web," UMI Microform 3082196, 2003, pp. 1-106.

Google: Google Gram—Google launches Froogle, M2 Presswire, Coventry, May 22, 2005, 1 pg.

Guha et al., "Propagation of Trust and Distrust," ACM, May 17-22, 2004, 10 pgs.

Haveliwala et al., "The Second Eigenvalue of the Google Matrix," Technical Report, Stanford, 2003, 8 pgs.

Haveliwala, "Topic-Sensitive PageRank: A Context-Sensitive Ranking Algorithm for Web Search," IEEE Transactions on Knowledge and Data Engineering, vol. 15, No. 4, Jul./Aug. 2003, pp. 784-796.

International Search Report for PCT/US2006/038552 mailed Aug. 31, 2007.

Kamvar et al., "The EigenTrust Algorithm for Reputation Management in P2P Networks," ACM, May 20-24, 2003, 12 pgs.

Kleinberg, "Authoritative Sources in a Hyperlinked Environment," Proceedings of the ACM-SIAM on Discrete Algorithms, 1998, IBM Research Report RJ 10076, May 1997.

Langville et al., "A Survey of Eigenvector Methods for Web Information Retrieval," Department of Mathematics, North Carolina State University, Dec. 17, 2003, , pp. 1-26.

Langville et al., "Deeper Inside PageRank," Internet Mathematics vol. 1, No. 3, Oct. 1, 2003, pp. 335-380.

Lempel et al., "Rank-Stability and Rank-Similarity of Link-Based Web Ranking Algorithms in Authority-Connected Graphs," Information Retrieval, 8, vol. 8, 2005, pp. 245-264.

Malaga et al., Web-Based Reputation Management Systems: Problems and Suggested Solutions, Electronic Commerce Research, vol. 1, 2001, pp. 403-417.

Massa et al., "Page-reRank: Using Trusted Links to Re-rank Authority," IEEE/WIC/ACM International Conference on Web Intelligence, 2005, 15 pgs.

Massa et al., "Trust-Aware Collaborative Filtering for Recommender Systems," LNCS 3290, 2004, pp. 492-508.

Mendelzon et al., "What do the Neighbours Think? Computing Web Page Reputations," IEEE Computer Society Technical Committee on Data Engineering, 2000, pp. 1-8.

Mui et al., "Evaluating Reputation in Multi-agents Systems," AAMAS 2002 Ws Trust, LNAI 2631, 2003, pp. 123-137.

ProQuest, "My Research," 2008, 1 pg.

Resnick et al., "Reputation Systems," Association for Computing Machinery, Communications of the ACM, Dec. 2000, vol. 43, No. 13, pp. 45-48.

Richardson et al., Trust management for the Semantic Web, Proceedings of the 2nd International Semantic Web Conference, 2003, 17 pgs.

Riggs et al., "An Algorithm for Automated Rating of Reviewers," JCDL 2001, Jun. 24-28, 2001, pp. 381-387.

Wang et al., "Computing PageRank in a Distributed Internet Search System," Proceedings of the 30th VLDB Conference, 2004, pp. 420. 431.

Zacharia et al., "Collaborative reputation mechanisms for electronic marketplace," Decision Support Systems 29 2000, pp. 371-388.

Zhang et al., "A Web Analysis Algorithm Combined with Content Correlation Analysis Method," J. Computer Science & Technology, Jan. 2003, vol. 18, No. 1, pp. 114-117.

Google, Office Action, Japanese Patent Application No. JP 2008-533768, Oct. 1, 2012, 3 pgs.

Google Inc., Office Action, Chinese Patent Application 200680043620.7, Oct. 8, 2010, 5 pgs.

Google Inc., Office Action, Japanese Patent Application 2008-533768, Dec. 21, 2011, 3 pgs.

Tateishi, A Reputation Search Engine from the Internet, the Journal of the Society for Artificial Intelligence, Japan, the Japanese Society for Artificial Intelligence, vol. 19, Issue 3, May 1, 2004, pp. 317-323.

Tateishi, A Reputation Search Engine That Collects People's Opinions Using Information Extraction Technology, IPSJ Transactions on Databases, vol. 45, No. SIG7(TOD22), Jun. 2004, 9 pgs.

Alguliev, Effective Summarization Method of Text Documents, Proceedings of the 2005 IEEE/WIC/ACM, Sep. 19, 2005, 8 pgs.

Google Inc., European Search Report, European Patent Application No. 11189258.4, Feb. 15, 2012, 6 pgs.

Google Inc., Office Action, Chinese Patent Application No. 200680043620.7, Mar. 7, 2012, 7 pgs.

Hahn, The Challenges of Automatic Summarization, Nov. 1, 2000, pp. 29-36.

Method for Automatic Extraction of Relevant Sentences from Text, IBM Technical Disclosure Bulletin, vol. 33, No. 6A, Nov. 1, 1990, 2 pgs.

Wang, Construction of Mathematic Model for Automatic Summarization, Proceedings of the Fourth International Conference on Machine Learning and Cybernetics, Guangzhou, Aug. 18-21, 2005, pp. 2278-2283.

White, Web document summarisation: a task-oriented evaluation, Sep. 3, 2001, pp. 951-955.

European Supplemental Search Report for EP 06825371 dated Jul. 22, 2011, 6 pgs.

* cited by examiner

<A href=Location 154-1 Identifier 156-1 >Review 158-1 </A>

Identifier Tag
118-3

<A href=Location 154-2 Identifier 156-2 Identifier 156-3 >Review 158-2 </A>

Identifier Tag
118-4

<XX Identifier 156-4> <A ... > Review 158-3 </A> ... </XX>

Identifier Tag
118-5

<XX Identifier 156-5> Encrypted Review 160 </XX>

Identifier Tag
118-6

Figure 1B

<A href=Location 154-1 Identifier 156-1 Rating Value 162-1 > text </A>

Rating Tag
120-3

<A href=Location 154-2 Identifier 156-2 Identifier 156-3 Rating Value 162-2 > </A>

Rating Tag
120-4

<XX Identifier 156-4 Rating Value 162-3 > <A ... > </A> ... </XX>

Rating Tag
120-5

<XX Identifier 156-5 Encrypted Rating Value 164 > </XX>

Rating Tag
120-6

Figure 1C

| Rating | Rating Value | |
|---|---|---|
| Excellent | 5 | 214-1 |
| Good | 4 | 214-2 |
| Adequate | 3 | 214-3 |
| Below Average | 2 | 214-4 |
| Poor | 1 | 214-5 |

210 = Rating; 212 = Rating Value; 200

Figure 2

EMBEDDED REVIEW AND RATING INFORMATION

FIELD OF THE INVENTION

The present invention relates generally to review and rating information. More specifically, the present invention relates generally to authoring tools for embedding information, such as review and rating information, in documents and to search engines (such as Internet and Intranet search engines) to process the embedded information.

BACKGROUND

Search engines provide a powerful tool for locating content in documents in a large database of documents, such as the documents on the Internet or World Wide Web (WWW), or the documents stored on the computers of an Intranet. The documents are located using an index of documents in response to a search query, consisting of one or more words, terms, keywords and/or phrases, that is submitted by a user. The document index is generated by scanning the documents using one or more network crawlers (or web crawlers). When the number of documents to be indexed is large (e.g., billions of documents), accomplishing such scanning in a timely manner usually involves multiple crawlers operating in parallel.

During the scanning of documents by one or more crawlers, additional content or documents may be discovered based on links to such additional content or documents embedded in the documents that are scanned. One existing approach to providing links to additional content or documents is in the form of link tags. In hypertext documents, such link tags (sometimes called anchor tags) may include links to other documents or to other parts of the same document. Existing link tags, however, have several limitations. Notably, the information in existing link tags only conveys a document location. While link tags may also contain commands for displaying text when the user performs a "mouse over" over the link tag, for displaying text when the user performs a "mouse out" away from the link tag, for refreshing the browser display, or for returning the browser to a previous document location, none of these commands convey information about an identified document or other entity. In particular, existing link tags do not convey opinions, such as reviews and/or ratings of the content or documents at the locations identified in the link tags. Existing link tags are also unable to convey information about the relative importance of the locations identified in the link tags. Furthermore, the information in existing link tags is public. There is no mechanism to secure the information in a link tag such that it may only be viewed by a restricted audience. There is a need, therefore, for improved anchors for use by search engines.

SUMMARY

A method of embedding evaluations in a document is described. An identifier tag is embedded in the document in response to a first user action. The document may be a web page. The identifier tag includes a review and an identifier of the entity that is the subject of the review. A rating tag may also be embedded in the document in response to a second user action. The rating tag includes a rating value corresponding to a user-selected rating of the entity that is the subject of the review. The rating value may be selected from a set of pre-determined rating values. In some embodiments, the identifier tag and review tag are the same tag, or both comprise portions of the same tag (e.g., both comprise information embedded within a link tag).

The identifier tag and the rating tag may be compatible with hypertext markup language (HTML) and/or extensible markup language (XML).

The entity that is the subject of a review and/or rating may include a product, a business, a service provider, a restaurant, a presentation including video, a written document, a publication and a song. The identifier tag and/or the rating tag may not displayed when the document is rendered by a browser.

The identifier tag and/or the rating tag may include metadata. The metadata may include one or more of the following: a user identifier, a category identifier, a timestamp for a purchase, a timestamp for a visit to the entity, a timestamp for the review and the rating, relative rating information, a favorite item at the entity, an expiration time for the review and the rating, one or more characteristics of one or more items at the entity, one or more characteristics of the subject of the review and the rating, and location information for the entity.

The document may be posted such that its accessible using a network. The review, the identifier and/or the rating value may be provided to an aggregator that collects a plurality of evaluations from one or more sources. In some embodiments, the identifier tag and the rating tag are compatible with a search engine crawler such that the search engine crawler imports and/or captures the review, the identifier and the rating value when accessing the document.

In some embodiments, an authoring tool is provided for inserting the identifier tag and the rating tag into the document. The authoring tool may be a program embedded in a web page and executable by a client computer. Providing the authoring tool may include transmitting an authoring web page, containing the embedded authoring tool, to a client computer using a network. The authoring tool may include instructions for modifying the authoring web page to include a replica of the document.

In another embodiment, a method of processing documents is described. A document is received in a search engine crawler. An identifier tag and rating tag are embedded in the document. The identifier tag includes a review and the identifier associated with the entity that is a subject of the review. The rating tag includes a rating value corresponding to a user-selected rating of the entity that is the subject of the review. The review, the identifier and/or the rating value are imported from the document. The review, the identifier and the rating value are aggregated in a repository that includes a plurality of reviews, identifiers and rating values from one or more sources.

In some embodiments, a weight associated with at least one of the identifier tag and the rating tag may be adjusted. One or more document ranking values for one or more document locations may be computed in accordance with the weight associated with the identifier tag and/or the rating tag.

In another embodiment, an identifier tag is generated in a document. The identifier tag includes a review and an identifier associated with the entity that is a subject of the review. The rating tag is generated in the document. The rating tag includes the rating value corresponding to the user-selected rating of the entity that is the subject of the review.

BRIEF DESCRIPTION OF THE DRAWINGS

For a better understanding of the invention, reference should be made to the following detailed description taken in conjunction with the accompanying drawings, in which:

FIG. 1B is a block diagram illustrating an embodiment of several identifier tags.

FIG. 1C is a block diagram illustrating an embodiment of several rating tags.

FIG. 2 is a block diagram illustrating an embodiment of a data structure containing pre-determined rating values.

Like reference numerals refer to corresponding parts throughout the drawings.

DETAILED DESCRIPTION OF EMBODIMENTS

Figure 1A:
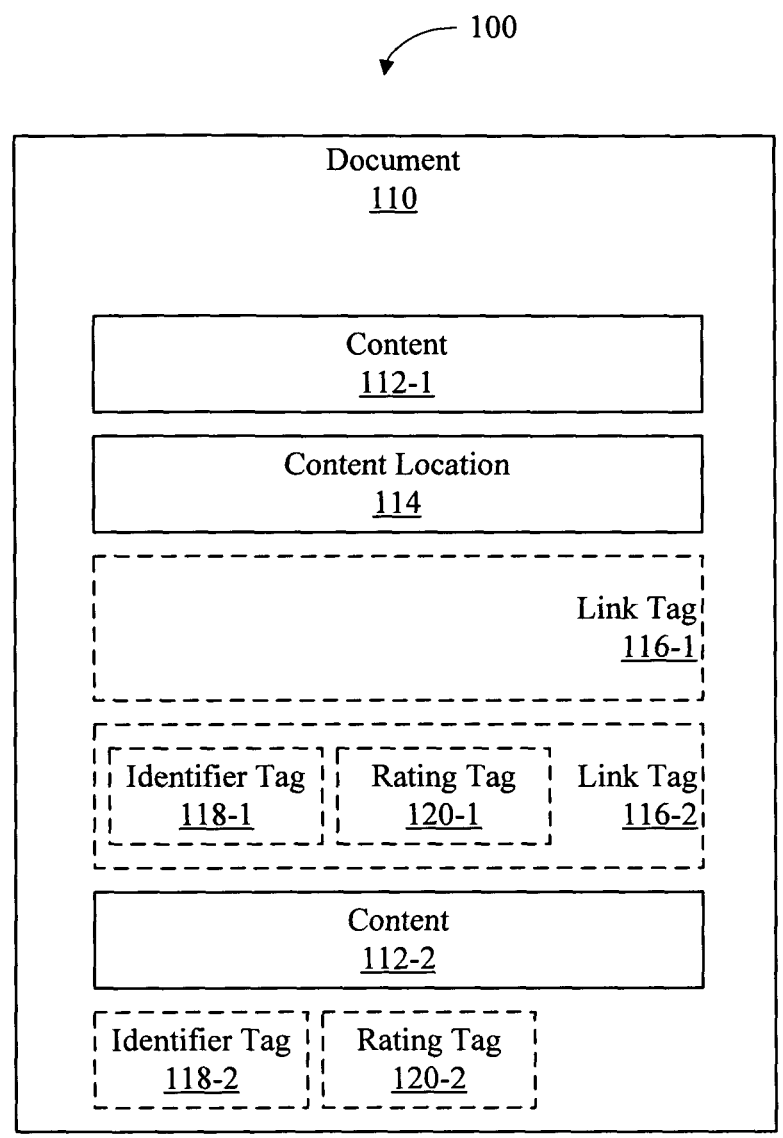
FIG. 1A is a block diagram illustrating an embodiment of a document.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Improved link tags embedded in documents are described. The link tags include identifier tags and rating tags. The identifier tags and the rating tags enable one or more users to provide reviews and rating values for entities. Entities may include products, businesses, service providers, restaurants, presentations including videos (such as movies), documents (such as books, articles, reviews of other entities, etc.), publications (such as newspapers, magazines or periodicals), web pages, web sites, songs, musical and audio recordings, and so on.

Throughout this description, it is to be understood that the "identifier tag" and "rating tag" may comprise parameters specified within a tag, such as a link tag or other HTML or XML tag. Thus, in some embodiments, the identifier tag and rating tag may encompass HTML and/or XML tags and attributes. Furthermore, in some embodiments or in some instances the identifier tag and rating tag may be the same tag or data structure, while in other embodiments or other instances, the identifier tag and rating tag may be different tags or data structures.

A given link tag in a document may correspond to content at one or more content locations or one or more document locations. The one or more content locations may be in the same document and/or in other documents. The document containing the link tag as well as the one or more document locations specified by the link tag may correspond to one or more web sites and/or one or more web pages. The one or more document locations may by represented in a link tag by one or more uniform resource locators (URLs). The document containing the link tag and the one or more document locations specified by the link tag may be on an Intranet and/or the Internet, which is also referred to as the World Wide Web (WWW).

The reviews and the rating values in the improved link tags may allow one or more users or publishers of content and/or documents to convey opinions about entities. The link tags may also allow users to convey a weighting of a relative importance of an entity. In some embodiments, at least a portion of the information in the improved link tags may be encrypted, to allow the one or more users to restrict the audience that may view the information in the link tags.

Users may be provided with an authoring tool to generate and embed the improved link tags in one or more documents. In some embodiments, the authoring tool may be embedded in a web page transmitted to one or more users.

The reviews and rating values in the improved link tags may be used by one or more web crawlers and/or search engines to determine how to process the content and/or documents associated with the link tags. The reviews and rating values may be provided to an aggregator, such as a restaurant review guide or a product information web site (e.g., www-.froogle.com) that collects evaluations of products, services, web sites or other entities from other sources.

In the discussion that follows, improved link tags for use with hypertext markup language (HTML) and/or extensible markup language (XML) are described. For example, an XML island containing an identifier tag and a rating tag may be included in an HTML link tag. Alternatively, attributes and values corresponding to the identifier tag and the rating tag may be added to existing HTML link tag formats or cascading style sheet (CSS) definitions. It is understood, however, that the improved link tags may be implemented using any suitable document markup language.

FIG. 1A illustrates an embodiment 100 of a document 110. The document 110 includes content 112, content location 114, informational tags, such link tags 116, identifier tags 118 and rating tags 120. The content location 114 may be a hypertext link in HTML. In the document 110, identifier tag 118-1 and rating tag 120-1 are embedded in the link tag 116-2. Each of the identifier tags 118 may include a review and an identifier associated with an entity that is a subject of the review. Each rating tag 120 may include a rating value corresponding to a user-selected rating of the entity that is the subject of the review.

Existing link tags in HTML, such as link tag 116-1, have several formats. For a link to another document that is at a local location on the network, a link tag including part of a URL, known as a relative URL, may be included in the document 110. For example, <A HREF="./links.html">another document</A>.

For a document that is not at a local location, a link tag including the full URL may be included in the document 110. For example, <A HREF="http://www.interesting.com/documents/links.html">another document</A>.

In addition, existing link tags may create links to content, such as content 112, at different content locations in the document 110. For example, <A HREF="section">section heading</A>.

In this case, at an appropriate location the document 110 also includes a link tag corresponding to "section", such as <A NAME="section">.

As illustrated in FIG. 1A, the document 110 may include one or more existing link tags, such as the link tag 116-1. When a link tag, such as the link tag 116-1, is activated, the user is taken to the content or document location associated with the link tag.

While existing link tags are useful, they contain limited information. The improved linked tags described below allow users, including publishers of content and/or documents, to embed review and rating information in the link tags. In an exemplary embodiment, the improved link tags are compatible with HTML and/or XML, thereby minimizing the disruption of the existing infrastructure. The improved link tags may allow the users to communicate review and rating information about the entities, the content locations and/or the document locations. This additional information (reviews and rating values) may be useful to WWW users. For example, the additional information may be useful in determining a relative importance or weighting for one or more content locations and/or document locations associated with one or more link tags, and ultimately, with one or more entities.

FIG. 1B illustrates several identifier tags 118. The identifier tags 118 include identifiers 156 associated with the entity that is the subject of the review and reviews 158. In some embodiments, the identifiers 156 may be attributes (letters, words) and/or numerical values corresponding to the respective entity. For example, a particular restaurant may be identified as "R"+"Name." Some of the identifier tags 118 include locations 154 corresponding to one or more content or document locations. The identifier tags 118 may include a URL, a unique integer, a business name and/or a set of identifying characteristics (for example, in a string). In some embodiments, multiple identifiers may be included in one or more of the identifier tags 118. For example, a review of a product, such as a digital camera, may compare two or more cameras and it may be useful to associate the review with identifiers for the two or more cameras.

Identifier tags 118-3 and 118-4 illustrate link tags that are compatible with existing HTML link tag formats. Identifier tags 118-5 and 118-6 illustrate link tags that are XML compatible. The HTML compatible identifier tags 118-3 and 118-4 are modified HTML anchor tags, while XML compatible identifier tag 118-5 contains an anchor tag within an XML tag or element. Functionally, they are equivalent. In identifier tag 118-6, however, the entire review (i.e., the content of the review) is located inside the XML tag, while in identifier tags 118-3, 118-4 and 118-5 the review is located in a webpage that is referenced by the identifier tag.

The identifier tag 118-6 also illustrates an encrypted review 160. This may be useful in embodiments where the user or publisher of content and/or documents, such as the document 110 (FIG. 1A), may wish to restrict the audience that is allowed to view at least some of the information in the link tags. HTML compatible link tags, such as the link tag 118-3 and/or 118-4, may also include encrypted content. The encrypted content, such as the encrypted review 160 and/or an encrypted identifier (e.g., identifier 156-1), may be encrypted using an encryption key from a non-symmetric key pair, such as public key infrastructure (PKI) or pretty good privacy (PGP) public-key encryption. Other embodiments may use nonce-based encryption, where padding, such as a pseudo-random sequence, is added prior to encryption. If a tag (such as an identifier tag 118) having encrypted content is contained within a web page, portions of the tag that are encrypted may not be displayed when the web page is rendered by a browser when the document is posted on a network. In some embodiments, the user performs a login operation before accessing a webpage containing a review.

FIG. 1C illustrates several rating tags 120. The rating tags 120 include optional identifiers 156 associated with the entity that is the subject of the review and rating values 162. In some embodiments, the rating values 162 may be numerical values. Ratings and rating values are discussed further below with reference to FIG. 2. Some of the rating tags 120 include locations 154 corresponding to one or more content or document locations. Rating tags 120-3 and 120-4 illustrate link tags that are compatible with existing HTML link tag formats. Rating tags 120-5 and 120-6 illustrate link tags that are XML compatible.

The rating tag 120-6 also illustrates an encrypted rating value 164. This may be useful in embodiments where the user or publisher of content and/or documents, such as the document 110 (FIG. 1A), may wish to restrict the audience that is allowed to view the rating value in a rating tag or link tag. The above discussion concerning encrypted content in identifier tags also applies to encrypted rating values in rating tags and/or link tags.

In some embodiments, one or more of the identifier tags 118 (FIG. 1B) and/or one or more of the rating tags 120 may also include metadata. Metadata may include a user identifier, a category identifier, a timestamp for a purchase, a timestamp for a visit to the entity, a timestamp for the review and the rating, relative rating information, a favorite item at the entity, an expiration time for the review and the rating, one or more characteristics of one or more items at the entity, one or more characteristics of the subject of the review and the rating, and/or location information for the entity.

FIGS. 1B and 1C illustrate separate identifier tags 118 and rating tags 120. In other embodiments, the identifier 118 and the rating tags 120 may be combined into a single tag, such as the link tag 116 (FIG. 1A). In an exemplary embodiment, XML islands containing the identifier tag and the rating tag are embedded in HTML link tags. For example, <Google:review id="12345"rating="4"reviewer="67890">I love this store because the selection is amazing </Google:review>.

In the preceding example, "Google" is an XML namespace that may be defined at the beginning of the document. "Review" may be a tag in the XML namespace. And "id," "rating" and "reviewer" may all be attributes that are applied to the review tag. The values of the "id," "rating" and "reviewer" may respectively identify the entity being reviewed, the rating value or score associated with the review and the reviewer.

The rating values 162 may be selected by users from a set of pre-determined values. FIG. 2 is a block diagram illustrating an embodiment of a data structure 200 containing pre-determined rating values. The data structure 200 includes a plurality 214 of ratings 210 and rating values 212. Ratings 210 may be verbal descriptions or adjectives characterizing the entity, such as "excellent." Rating values 212 may be numerical values, such as numbers between 1 and 5.

Figure 3A:
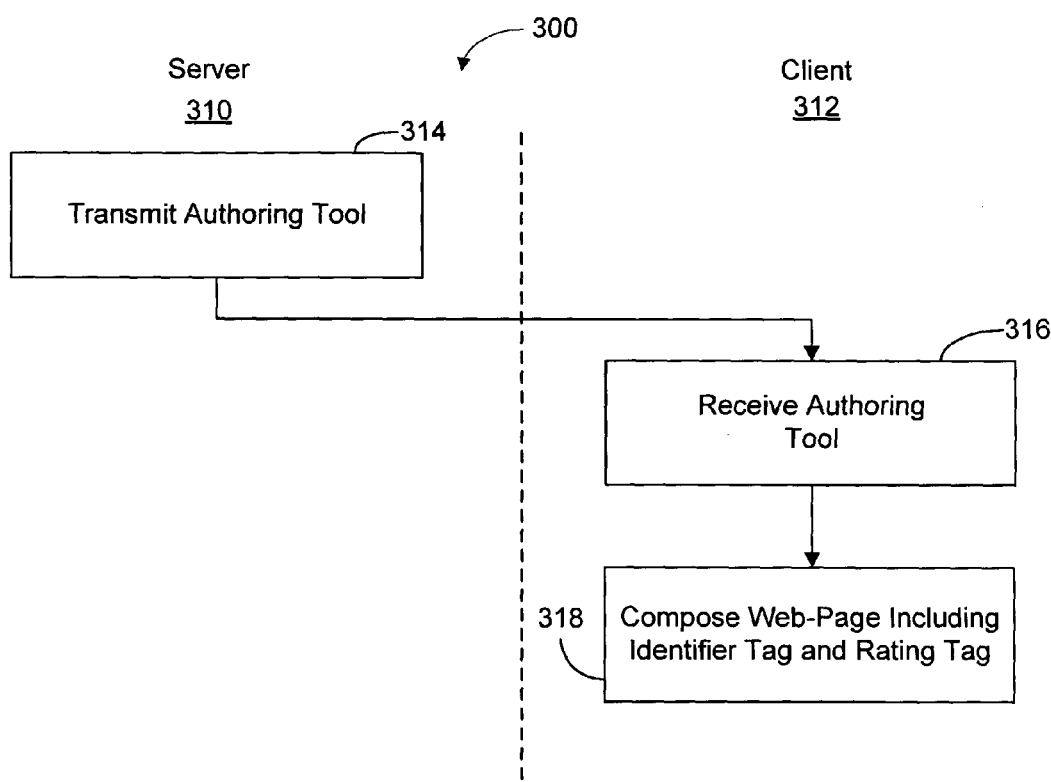
FIG. 3A is a flow diagram illustrating an embodiment of interaction between a client and a server.

In embodiments where the document (e.g., the document containing a review and a rating value) is a web page, the user may be assisted in generating and embedding the identifier and rating tags by an authoring tool. This is illustrated in FIG. 3A, which shows an embodiment of a method 300 of composing a web page. An authoring tool is transmitted (314) by a server 310 to a client 312. After the authoring tool is received (316) by the client 312, a web page including an identifier tag and a rating tag is composed by the user (318) using the authoring tool. The method of composing a web page 300 may include fewer operations or additional operations. In addition, two or more operations may be combined and/or the order of the operations may be changed.

Figure 3B:
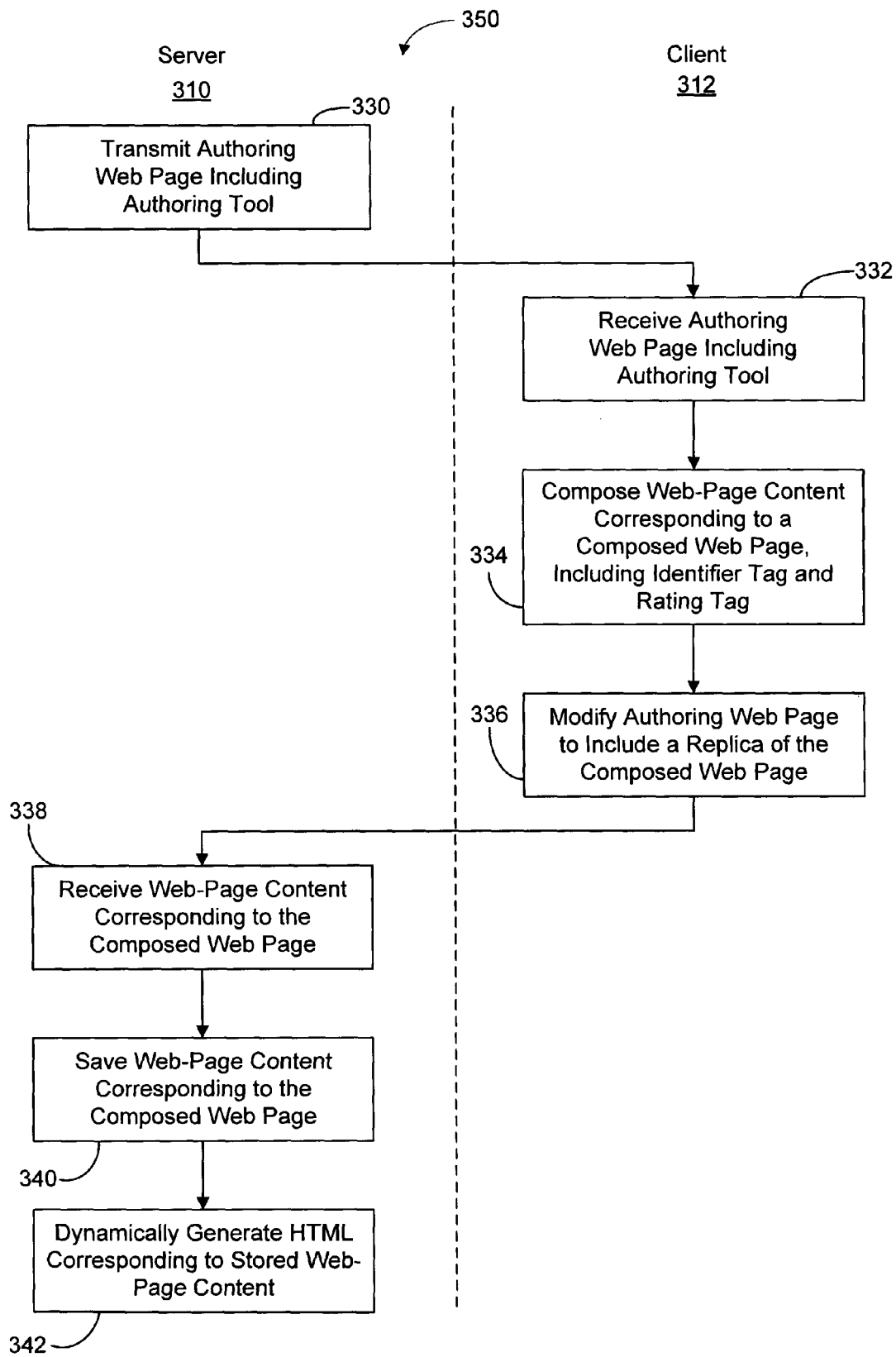
FIG. 3B is a flow diagram illustrating an embodiment of interaction between a client and a server.

In some embodiments, the authoring tool may be embedded in a web page and executable by a client computer. In other embodiments, the authoring tool may be embedded in various applications such as a word processing application, a spreadsheet application, blog and email client applications, a presentation authoring application, or the like. In such embodiments, the authoring tool may be applied to word processor documents, spreadsheets, blogs, email messages and/or presentations. Using a web page as an example, web-page content corresponding to the composed web page (the document in these embodiments) may be stored on a server. The composed web page may be dynamically generated on the server. This is illustrated in FIG. 3B, which shows a flow diagram illustrating a method of composing a web page 350. An authoring web page including an authoring tool is transmitted (330) from a server 310 and is received (332) at a client 312. Web-page content corresponding to a composed web page, including the identifier tag and the rating tag (334), may be composed by the user using the authoring tool. The authoring web page may be modified to include a replica of the composed web page (336) during the authoring process. The server 310 may receive the web-page content corresponding to the composed web page (338). The web-page content corresponding to the composed web page may be saved (340) on the server 310. HTML corresponding to one or more instances of the stored web-page content may be dynamically generated (342) and transmitted to various client devices in response to requests from those client devices. The method 350 may include fewer operations or additional operations. In addition, two or more operations may be combined and/or the order of the operations may be changed.

Figure 4A:
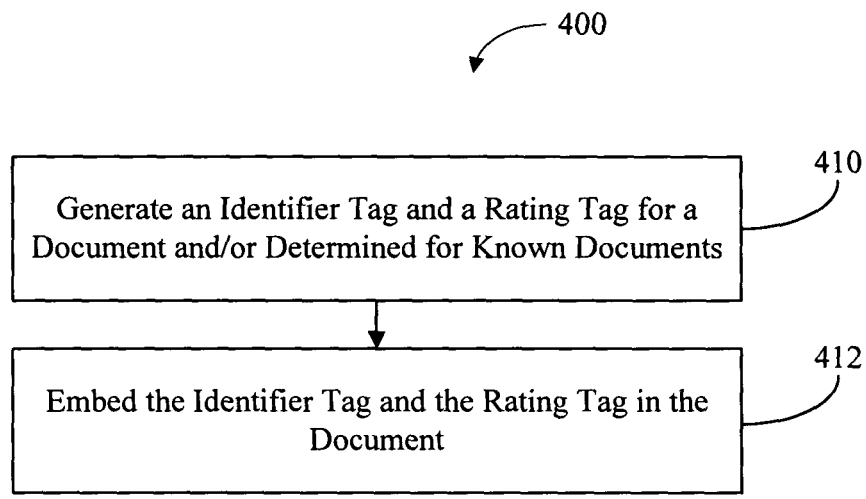
FIG. 4A is a flow diagram illustrating an embodiment of generating and embedding an identifier tag and a rating tag in a document.

Regardless of the implementation of the authoring tool, it performs several operations. This is illustrated in FIG. 4A, which shows a flow diagram illustrating an embodiment of a method 400 of generating and embedding an identifier tag and a rating tag in a document using, for example, an authoring tool. An identifier tag and a rating tag may be generated for the document and/or determined for known documents (410). The identifier tag and the rating tag may be embedded in the document (412). Embedding of the identifier tag may be in response to a first user action. Embedding the rating tag may be in response to a second user action. The method 400 may include fewer operations or additional operations. In addition, two or more operations may be combined and/or the order of the operations may be changed.

Figure 4B:
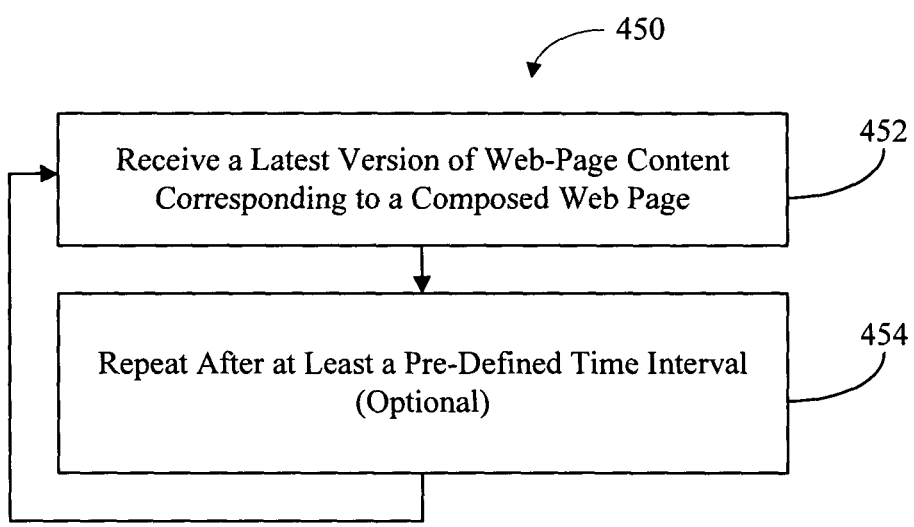
FIG. 4B is a flow diagram illustrating an embodiment of storing web-page content.

In those embodiments where the authoring tool is embedded in a web page and where web-page content is stored on a server, an archiving operation may occur one or more times. This is illustrated in FIG. 4B, which shows a flow diagram illustrating an embodiment of a method 450 of storing web-page content. A latest version of the web-page content corresponding to a composed web page may be received (452). This operation may be optionally repeated after at least a pre-defined time interval (454). For example, the latest version may be received after a few seconds, after tens of seconds, after a minute or after longer time intervals. The method 450 may include fewer operations or additional operations. In addition, two or more operations may be combined and/or the order of the operations may be changed.

After generating the document, such as a web page, the user may post it on a network, such as the Internet. The posting may be direct or indirect, for example, by storing corresponding web-page content on the server. The review and rating information in one or more of the link tags, such as the identifier tags 118 (FIG. 1B) and/or the rating tags 120 (FIG. 1C), in the document may be imported or captured and aggregated in a repository or a database with similar evaluation information provided by other users and/or sources. Alternatively, the review and rating information in one or more of the link tags, such as the identifier tags 118 (FIG. 1B) and/or the rating tags 120 (FIG. 1C), in the document may be used to select processing of content and/or documents associated with one or more of the link tags. In an exemplary embodiment, the processing may include blocking processing of content and/or documents associated with one or more entities being reviewed using the link tags. The review and rating information may be used to change one or more weights and/or one or more rank values corresponding to one or more content locations and/or document locations associated with one or more entities. The changing of the one or more weights and/or the one or more rank values may be implemented by a web crawler that receives a document, such as the document 110 (FIG. 1A), containing one or more link tags 116 (FIG. 1A), identifier tags 118 (FIG. 1A) and/or rating tags 120 (FIG. 1A). The one or more changed weights and/or the one or more rank values may be used by a search engine to compute one or more scores corresponding to the one or more content locations and/or document locations associated with one or more of the entities. The one or more changed weights and/or the one or more rank values may also be used in parsing of terms or information in a search query.

Figure 5A:
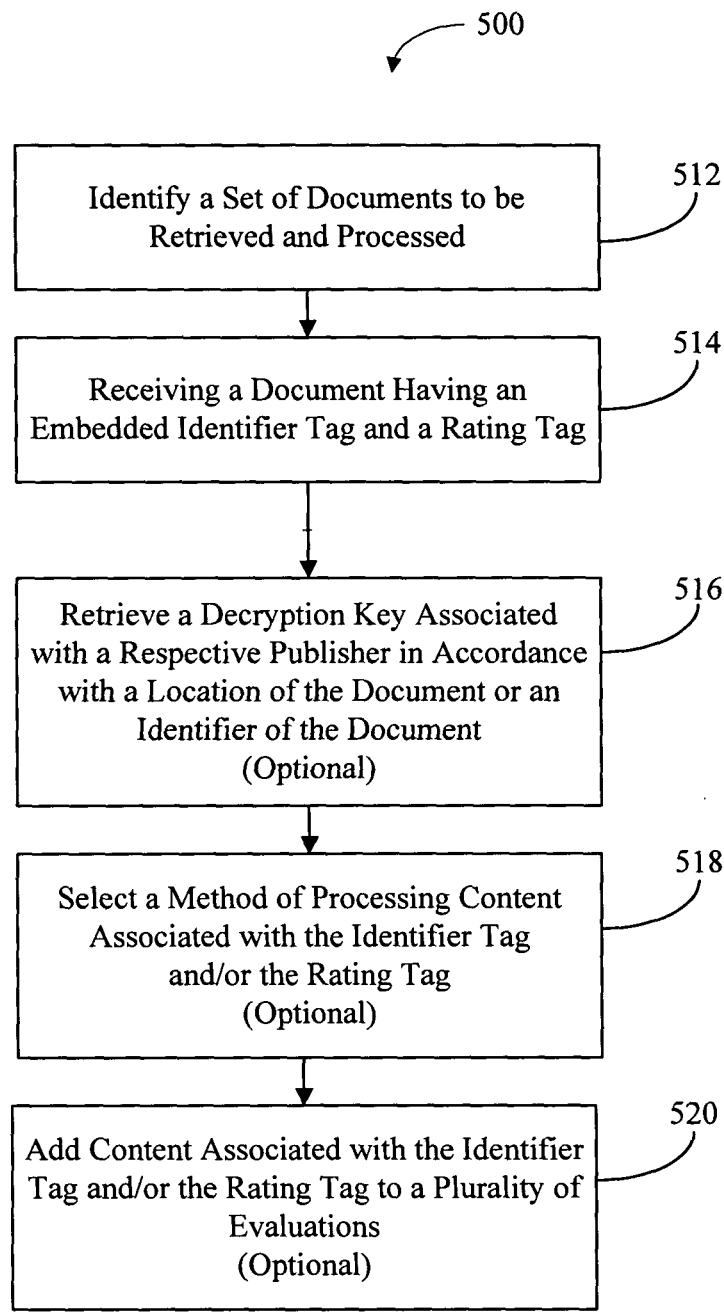
FIG. 5A is a flow diagram illustrating an embodiment of a method of using an identifier tag and a rating tag.
Figure 5B:
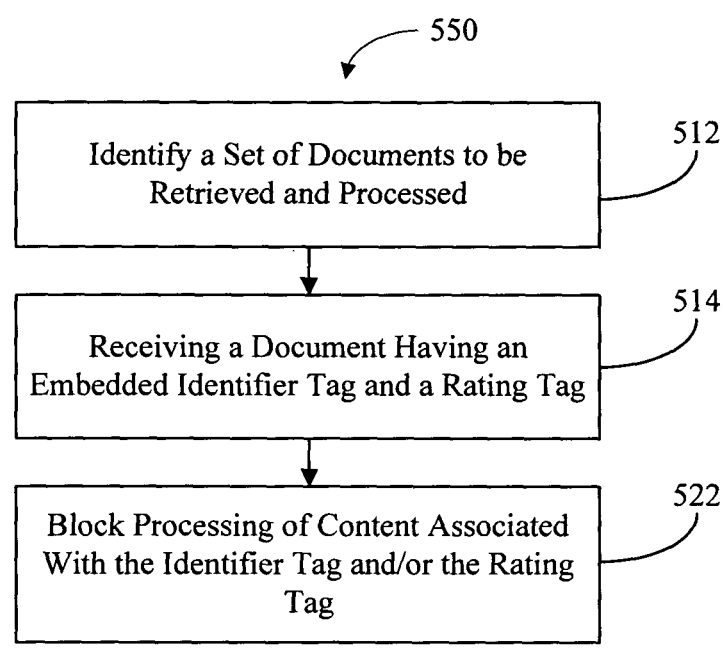
FIG. 5B is a flow diagram illustrating an embodiment of a method of using an identifier tag and a rating tag.
Figure 5C:
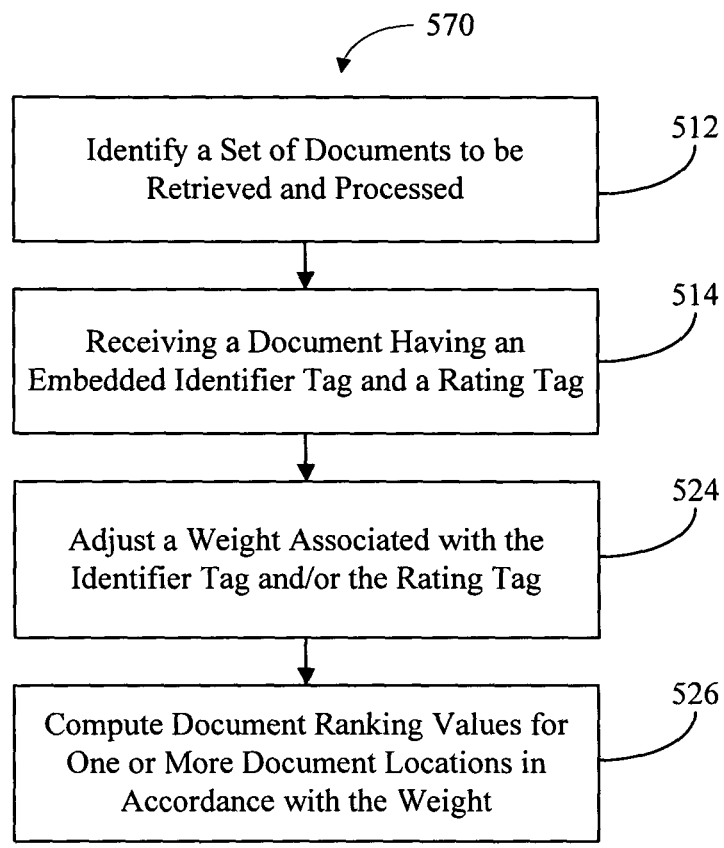
FIG. 5C is a flow diagram illustrating an embodiment of a method of using an identifier tag and a rating tag.

FIGS. 5A-C illustrate several embodiments of content or document processing methods that utilize identifier tags and/or a rating tags in documents. FIG. 5A is a flow diagram illustrating an embodiment of a method 500 of using an identifier tag and a rating tag. A set of documents to be retrieved and processed is identified (512). A document having an embedded identifier tag and a rating tag is received (514). Following operation 514, at least one of the following three operations is performed in accordance with this embodiment. A decryption key associated with a respective publisher is optionally retrieved in accordance with a location of the document or an identifier of the document (516). A method of processing content associated with the identifier tag and/or the rating tag is optionally selected (518). Content associated with the identifier tag and/or the rating tag may be optionally added to a set or database of evaluations (520). The method 500 may include fewer operations or additional operations. In addition, two or more operations may be combined and/or the order of the operations may be changed.

FIG. 5B is a flow diagram illustrating an embodiment of a method 550 of using an identifier tag and a rating tag. The set of documents to be retrieved and processed is identified (512), and then one of the identified documents which has an embedded identifier tag and a rating tag is received (514). Processing of content associated with the identifier tag and/or the rating tag is blocked (522), i.e., the method prevents the content identified by the identifier tag from being processed (e.g., because of the rating in the rating tag). The method 550 may include fewer operations or additional operations. In addition, two or more operations may be combined and/or the order of the operations may be changed.

FIG. 5C is a flow diagram illustrating an embodiment of a method 570 of using an identifier tag and a rating tag. The set of documents to be retrieved and processed is identified (512), and one of the identified documents that has an embedded identifier tag and a rating tag is received (514). A weight associated with the identifier tag and/or the rating tag is adjusted (524), and a document ranking value for one or more document locations is computed in accordance with the weight (526). In this way, a weight/importance of a document containing, for example, a review and/or an object of the review, may be modified such that it is given a more significant position in a set of search results. The method 570 may include fewer operations or additional operations. In addition, two or more operations may be combined and/or the order of the operations may be changed.

Figure 6:
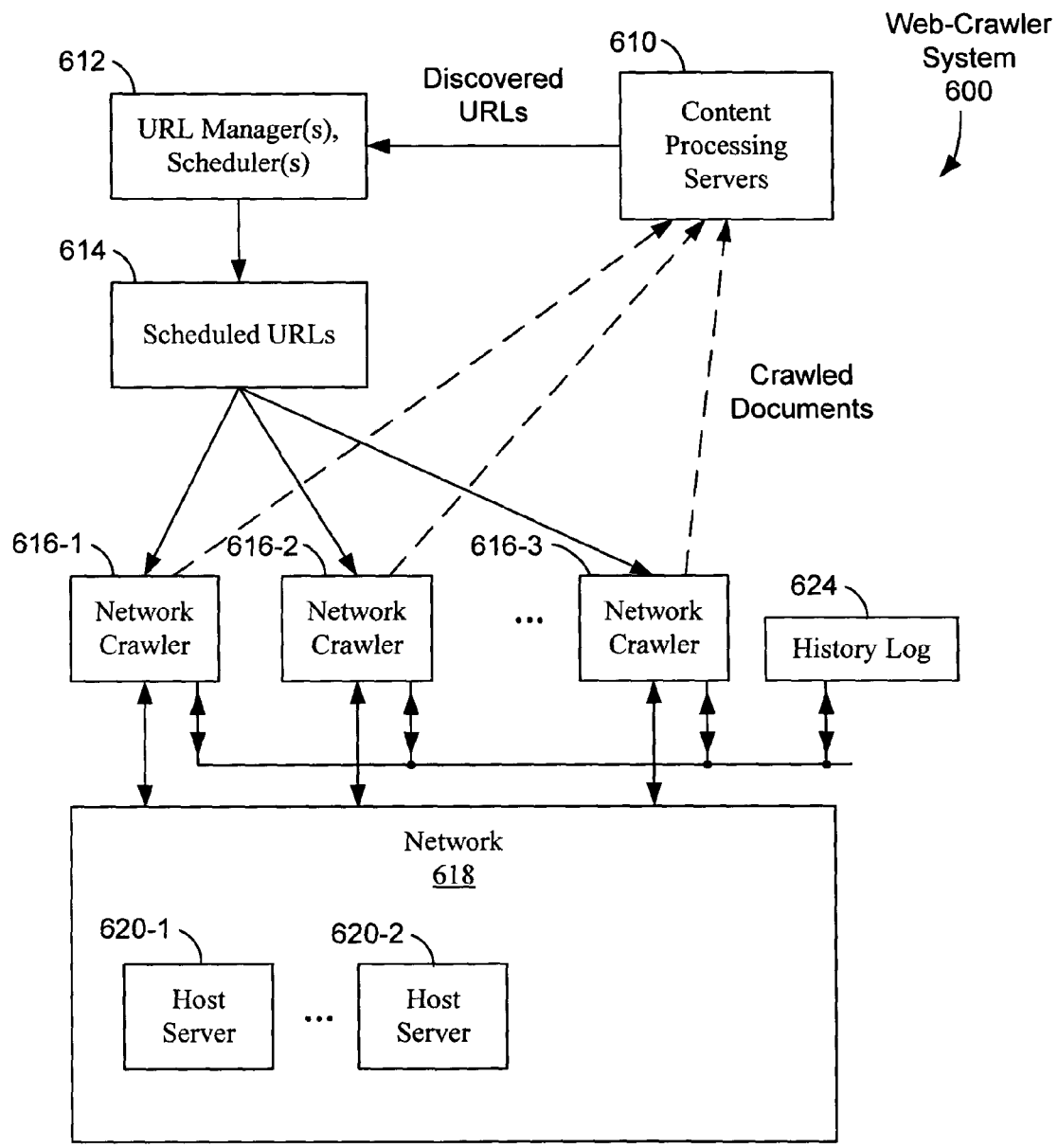
FIG. 6 is a block diagram illustrating an embodiment of a web crawler system.

Attention is now given to hardware and systems that may utilize and/or implement the improved link tags, such as the identifier tags and the rating tags, and the embodiments 300 (FIG. 3A), 350 (FIG. 3B), 400 (FIG. 4A), 450 (FIG. 4B), 500 (FIG. 5A), 550 (FIG. 5B) and 570 of the methods discussed above. FIG. 6 illustrates an embodiment of a web-crawler system 600 that may utilize the improved link tags. Content processing servers 610 inspect web pages and other documents downloaded by a plurality of network crawlers 616 to identify new or previously known URLs, or other addresses, of documents to be crawled by the set of network crawlers 616. Network crawlers 616 are also called web crawlers. The URLs processed by the network crawlers 616 may correspond to locations within host servers 620 on a network 618. The host servers 620 may host web sites (i.e., sets of linked documents), and/or they may store documents in a document database. URL managers and schedulers 612 determine which URLs (herein called the scheduled URLs 614) to schedule for crawling by the plurality of network crawlers 616. The network crawlers 616 access and download documents, such as web pages and other types of documents, from the host servers 620 on the network 618.

The network 618 may be the Internet, a portion of the Internet, an Intranet or portion there of, or a specified combination of Intranet(s) and/or host servers on the Internet. The documents and web pages stored by the host servers 620 contain links to other documents or web pages. Conceptually, the network crawlers 616 are programs that automatically traverse the network's hypertext structure. In practice, the network crawlers 616 may run on separate computers or servers. For convenience, the network crawlers 616 may be thought of as a set of computers, each of which is configured to execute one or more processes or threads that download documents from the scheduled URLs 614.

The network crawlers 616 receive the assigned URLs and download (or at least attempt to download) the documents at those URLs. The network crawlers 616 may also retrieve documents that are referenced by the retrieved documents. The network crawlers 616 pass the retrieved documents to the content processing servers 610, which process the links in the downloaded pages, from which the URL managers and schedulers 612 determine which pages are to be crawled. A history log 624 stores information identifying the URLs visited.

Network crawlers 616 use various protocols to download pages associated with URLs, such as HTTP, HTTPS, gopher and File Transfer Protocol.

The content processing servers 610 may utilize one or more of the improved link tags in one or more retrieved documents to select processing of content and/or documents. The selected processing may include changing of the weights and/or ranking values in a document index corresponding to one or more content locations and/or document locations associated with one or more of the link tags. The selected processing may also include blocking processing of content and/or documents associated with one or more link tags. The URL manager(s) and schedulers 612 may exclude content locations and/or documents locations corresponding to blocked content and/or documents from the scheduled URLs 614.

Figure 7:
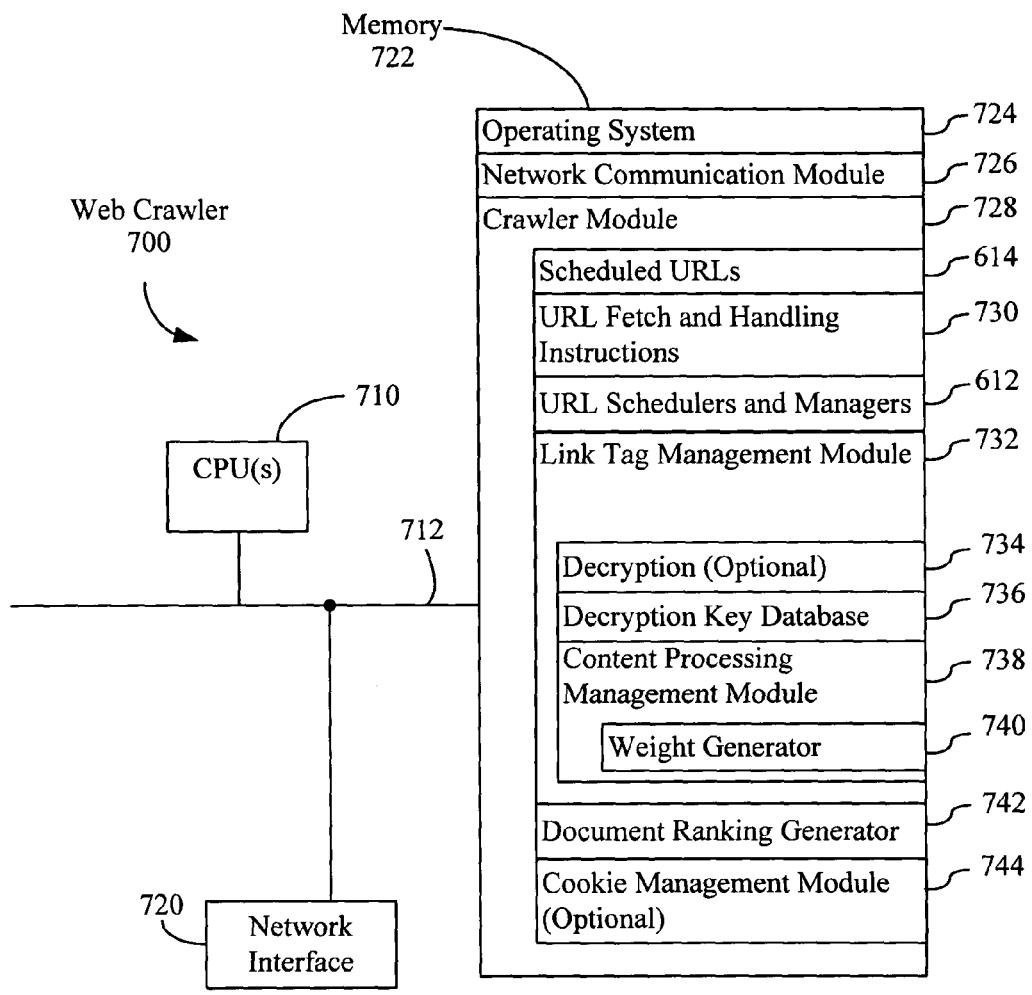
FIG. 7 is a block diagram illustrating an embodiment of a web crawler.

FIG. 7 illustrates an embodiment of a web crawler 700, such as network crawler 616-1 (FIG. 6). The web crawler 700 includes one or more central processing units 710, one or more network interfaces 720, and memory 722, all of which are interconnected by one or more signal lines or communication buses 712. The one or more network interfaces 720 enable communications with host servers 620 (FIG. 6), one or more servers containing the scheduled URLs 614 (FIG. 6), content processing servers 610 (FIG. 6), and possibly other servers, such as one or more servers containing the history log 624 (FIG. 4).

The memory 722 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 722 may optionally include mass storage that is remotely located from the CPU(s) 710. In some embodiments, memory 712 stores the following programs, modules and data structures, or a subset thereof:

an operating system 724 that includes procedures (or a set of instructions) for handling various basic system services and for performing hardware dependent tasks, a network communications module 726 (or a set of instructions) for controlling communications via the one or more network interfaces 720; and a crawler module 728 (or a set of instructions).

The crawler module 728 includes the following programs, modules and data structures, or a subset thereof:

a set of scheduled URLs 614 to be crawled,

URL fetch and handling instructions 730,

URL schedulers and managers 612, a link tag management module 732, a document ranking generator 742, and an optional cookie management module 744.

The link tag management module 732 optionally includes instructions 734 for decrypting at least a portion of the improved link tag information, a decryption key database 736 for various publishers and content processing management module 738. The content processing management module 738 includes weight generator 740.

Figure 8:
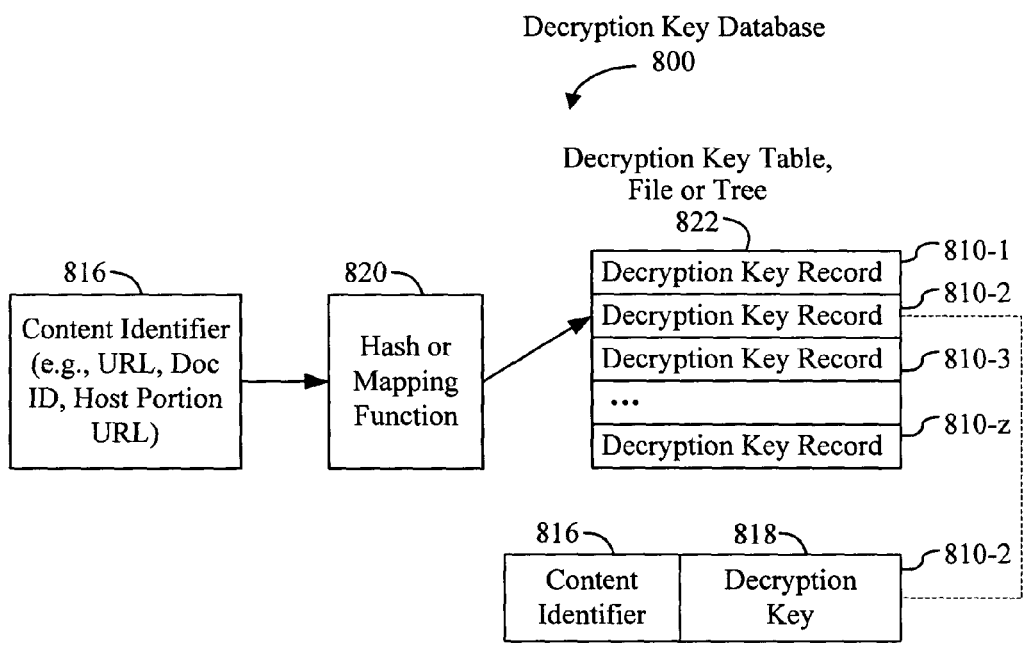
FIG. 8 is a block diagram illustrating an embodiment of a decryption key database.

FIG. 8 illustrates an embodiment of a decryption key database 800, such as the decryption key database 536 (FIG. 5). The decryption key database 800 includes multiple entries 810, herein also called decryption key records, each of which stores a decryption key associated with a content identifier 816. The content identifier 816 may be a URL; a partial URL identifying a web site, a set of web sites or a portion of a web site; a document identifier; or a publisher identifier. In those embodiments where at least a portion of one or more of the information tags is encrypted, the decryption key database may contain the requisite information used by the web crawler 700 (FIG. 7) or the web-crawler system 600 (FIG. 6) to decrypt the information. Entries 810 may correspond to different publishers of content or documents. In an exemplary embodiment, an operator of a web-crawler system, such as the web-crawler system 600 (FIG. 6), may provide users or publishers with encryption keys to use, if desired, with at least a portion of the information in improved link tags embedded in the content and/or documents produced by the users or the publishers.

Figure 9:
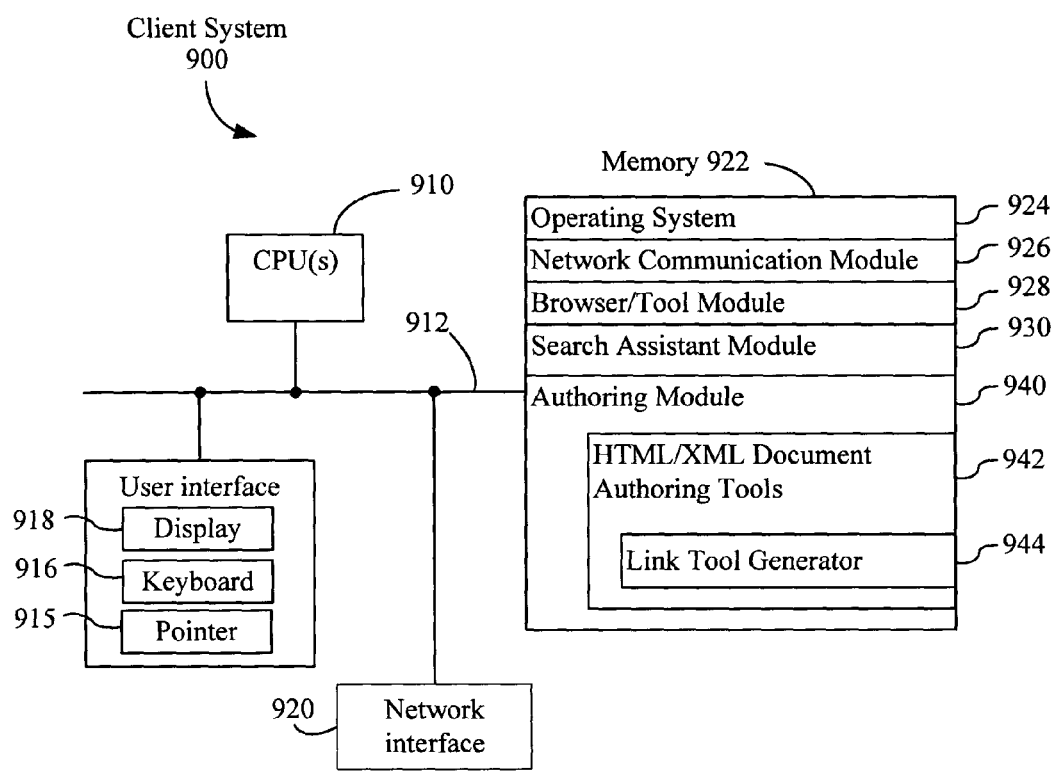
FIG. 9 is a block diagram illustrating an embodiment of a client system.

FIG. 9 illustrates a block diagram of an embodiment of a client system 900. The client system 900 may include at least one data processor or central processing unit (CPU) 910, one or more optional user interfaces 914, a communications or network interface 920 for communicating with other computers, servers and/or clients, a memory 922 and one or more communication buses or signal lines 912 for coupling these components to one another. The user interface 914 may have one or more pointer devices 915 (e.g., mouse, trackball, touchpad or touch screen), keyboards 916 and/or one or more displays 918.

Memory 922 may include high-speed random access memory, such as DRAM, SRAM, DDR RAM or other random access solid state memory devices; and/or non-volatile memory, such as one or more magnetic disk storage devices, optical disk storage devices, flash memory devices, or other non-volatile solid state storage devices. Memory 922 may store an operating system 924, such as LINUX, UNIX or WINDOWS, that includes procedures (or a set of instructions) for handling basic system services and for performing hardware dependent tasks. Memory 922 may also store communication procedures (or a set of instructions) in a network communication module 926. The communication procedures are used for communicating with a search engine.

Memory 926 may also include a browser or browser tool module 928 (or a set of instructions), the search assistant module 930 (or a set of instructions) and an authoring module 940 (or a set of instructions). The search assistant module 930 may be implemented using executable code such as JavaScript which may be included in a search portal web page or a page of search results, as a plug-in application program attached to browser or browser tool 928, or a stand-alone application. The search assistant module 730 may include instructions for assisting or monitoring user entry of a search query, for sending a search query to a search engine, and/or for receiving and displaying search results. The authoring module 940 may include HTML/XML document authoring tools 942. The HTML/XML document authoring tools 942 may include a link tool generator 944 for generating the improved link tags, such as the identifier tags and/or the rating tags.

In embodiments where the client system 900 is coupled to a local server computer, one or more of the modules and/or applications in the memory 922 may be stored in a server computer at a different location than the user.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. The memory 922 may include additional modules and/or sub-modules, or fewer modules and/or sub-modules. For example, the search assistant module 930 may be integrated into the browser/tool module 928. Memory 922, therefore, may include a subset or a superset of the above identified modules and/or sub-modules.

Figure 10:
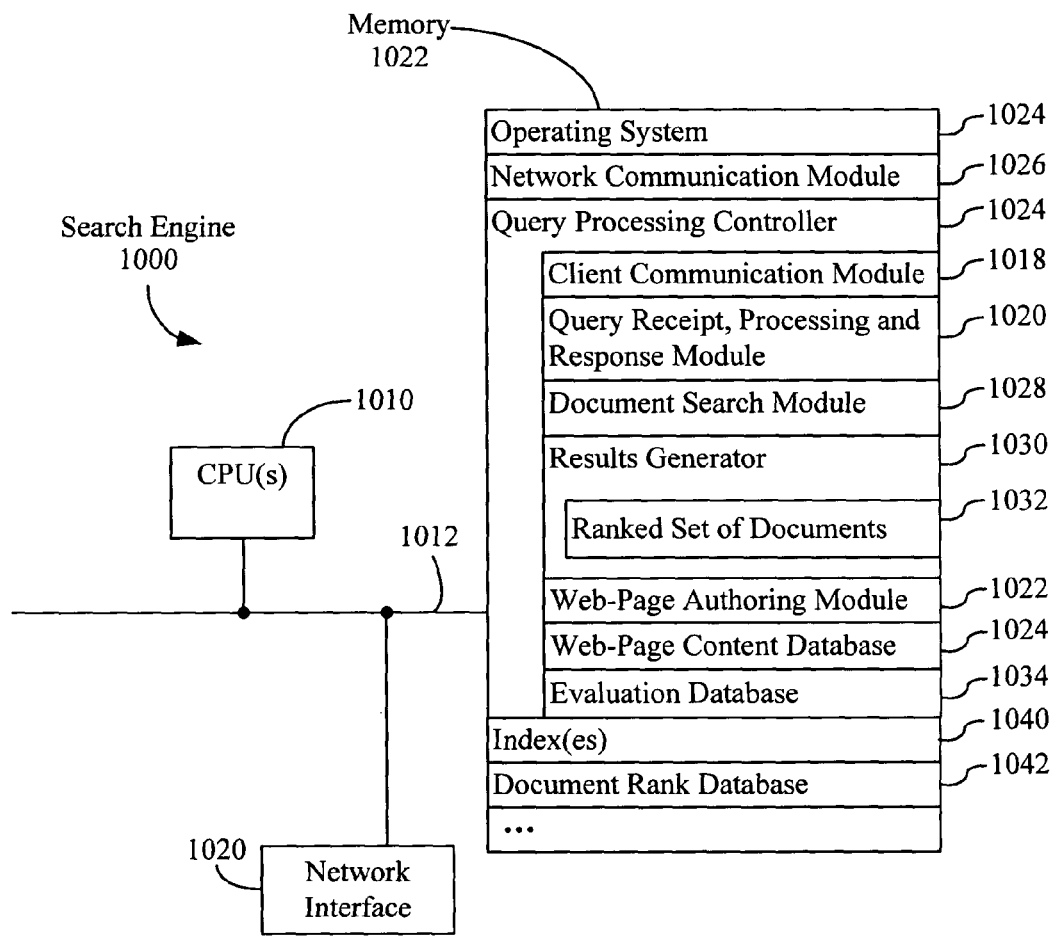
FIG. 10 is a block diagram illustrating an embodiment of a search engine.

FIG. 10 illustrates an embodiment of a search engine system 1000 that generates search results in response to search queries from one or more clients, such as the client described above with reference to FIG. 9. Note that the search engine system 1000 can be used as an Internet search engine, for locating documents on the WWW and/or as an Intranet search engine, for locating documents stored on servers or other hosts within an Intranet. In addition, the methodology described herein is applicable to implementations where only portions of documents, such as titles and abstracts, are stored in the database of the search engine system 1000.

The search engine 1000 may include at least one data processor or central processing unit (CPU) 1010, a communications or network interface 1020 for communicating with other computers, servers and/or clients, memory 1022 and one or more communication buses or signal lines 1012 for coupling these components to one another.

Memory 1022 may include high-speed random access memory and/or non-volatile memory, such as one or more magnetic disk storage devices. Memory 1022 may store an operating system 1024, such as LINUX, UNIX or WINDOWS, that includes procedures (or a set of instructions) for handling basic system services and for performing hardware dependent tasks. Memory 1022 may also store communication procedures (or a set of instructions) in a network communication module 1026. The communication procedures are used for communicating with clients, such as the client 900 (FIG. 9), and with other servers and computers in the search engine 1000.

Memory 1022 may also store a query processing controller 1026 (or a set of instructions). The query processing controller 1026 may include the following elements, or a subset or superset of such elements: client communication module 1018, query receipt, processing and response module 1020, document search module 1028, results generator 1030, web-page authoring module 1022, web-page content database 1024 and evaluation database 1034. The results generator 1030 may produce a ranked set of documents 1032. The ranked set of documents 1032 may be generated by searching a document database 1042, using an inverse document index 1040 to find documents in the document database 1042 that match a specified query, to produce an initial set of ranked results. The results generator 1030 may then use information obtained from the improved link tags to revise the rankings of the results, thereby allowing search results to reflect reviews and/or rating values, such as relative importance or weights, provided by content and/or document users or publishers.

Although FIG. 10 shows search engine 1000 as a number of discrete items, FIG. 10 is intended more as a functional description of the various features which may be present in a search engine system rather than as a structural schematic of the embodiments described herein. In practice, and as recognized by those of ordinary skill in the art, the functions of the search engine 1000 may be distributed over a large number of servers or computers, with various groups of the servers performing particular subsets of those functions. Items shown separately in FIG. 10 could be combined and some items could be separated. For example, some items shown separately in FIG. 10 could be implemented on single servers and single items could be implemented by one or more servers. The actual number of servers in a search engine system and how features, such as the query processing controller 1026, are allocated among them will vary from one implementation to another, and may depend in part on the amount of information stored by the system and/or the amount data traffic that the system must handle during peak usage periods as well as during average usage periods.

The search engine system 1000 may include multiple data centers each housing a backend. The data centers are generally widely dispersed from one another, such as across the continental United States. Search queries submitted by users at one of the clients 1010 to the search engine system 1000 are routed to an appropriate backend as part of the Domain Name System (DNS), based on current load, geographic locality and/or whether that data center is operating. Each backend preferably includes multiple query servers coupled to a communications network via a network interface 1020. The communications network may be the Internet, but may also be any local area network (LAN) and/or wide area network (WAN).

The search rank values for the documents in the search results are conveyed to the query processing controller 1026, and are used to construct an ordered search result list. Once the query processing controller 1026 constructs the ordered search result list, the query processing controller 1026 transmits to the document database 1032 a request for snippets of an appropriate subset of the documents in the ordered search list. For example, the query processing controller 1026 may request snippets for the first fifteen or so of the documents in the ordered search result list. The document database 1032 constructs snippets based on the search query, and returns the snippets to the query processing controller 1026. The query processing controller 1026 then returns a list of located documents and snippets back to the requesting client. In some embodiments, the snippets are stored in a cache server along with the cached results. As a result, in these embodiments the query processing controller 1026 only requests snippets for documents, if any, for which it is unable to obtain valid cached snippets from the cache server.

The information in the improved link tags may be used to change the weights and/or rank values associated with one or more content locations and/or document locations stored in the document database 1042. The information in the improved link tags may be used to Change the weights and/or rank values associated with content and/or documents stored in the document database 1042. The changed weights and/or ranks may be used by the query processing controller 1026 to compute one or more scores corresponding to the one or more content locations and/or document locations. The one or more changed weights and/or the one or more rank values may also be used in parsing of terms or information in a search query received by the query processing controller 1026.

Figure 11:
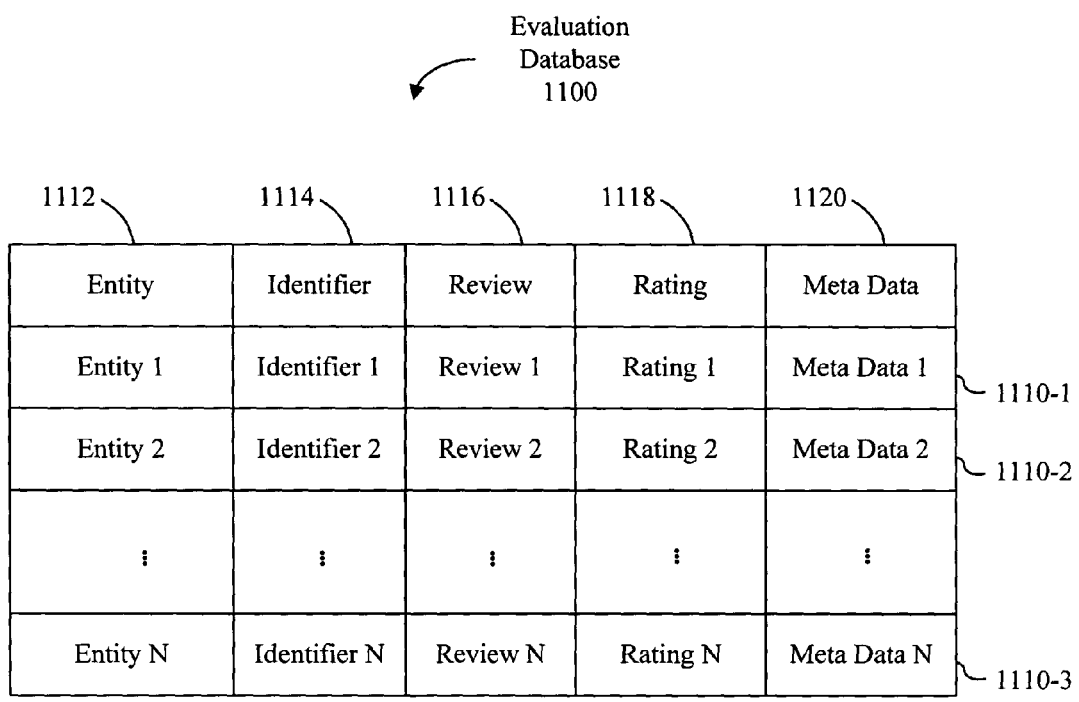
FIG. 11 is a block diagram illustrating an embodiment of an evaluation database.

FIG. 11 is a block diagram illustrating an embodiment of an evaluation database 1100. The evaluation database 1100 may be used by a search engine to aggregate evaluation information from a plurality of users and/or sources. The evaluation database 1100 includes multiple entries 1110 for entities 1112, identifiers 1114, reviews 1116, ratings and/or rating values 1118 and meta data 1120.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of embedding evaluations in a document, comprising:
at a client device having one or more processors and memory storing programs executed by the one or more processors:
receiving a document including an authoring tool from a remote server system and displaying the document and the authoring tool to a user, wherein the document is written in a markup language;
in response to user actions, modifying the document using the authoring tool by performing at least the following two operations:
embedding an identifier tag in the document in response to a first user action, wherein the identifier tag includes a review from the user and an identifier associated with an entity, distinct from the document, that is a subject of the review; and
embedding a rating tag in the document in response to a second user action, wherein the rating tag includes a rating value from the user, the rating value corresponding to a user-selected rating of the entity that is the subject of the review; and
transmitting the document including the embedded identifier tag and the embedded rating tag from the client device to the remote server system;
submitting a search query to the remote server system; and
receiving from the remote server system an ordered list of search results including a search result corresponding to the document, wherein the search result's position in the ordered list is determined at least in part by a ranking value of the document that is determined in accordance with the review in the identifier tag and the rating value in the rating tag.

2. The method of claim 1, wherein the document comprises a web page.

3. The method of claim 1, further comprising posting the document such that it is accessible using a network.

4. The method of claim 1, wherein the rating value is selected from a set of pre-determined rating values.

5. The method of claim 1, further comprising transmitting the review, the identifier and the rating value from the client device to an aggregator that collects a plurality of evaluations from one or more sources.

6. The method of claim 1, wherein the entity is selected from the group consisting of a product, a business, a service provider, a restaurant, a presentation including video, a written document, a publication and a song.

7. The method of claim 1, wherein at least one of the identifier tag and the rating tag is not displayed when the document is rendered by a browser.

8. The method of claim 1, wherein at least one of the identifier tag and the rating tag is compatible with hypertext markup language (HTML).

9. The method of claim 1, wherein at least one of the identifier tag and the rating tag is compatible with extensible markup language (XML).

10. The method of claim 1, wherein the identifier tag and the rating tag are compatible with a search engine crawler such that the search engine crawler imports the review, the identifier and the rating value when accessing the document.

11. The method of claim 1, wherein at least one of the identifier tag and the rating tag includes metadata.

12. The method of claim 11, wherein the metadata is selected from the group consisting of a user identifier, a category identifier, a timestamp for a purchase, a timestamp for a visit to the entity, a timestamp for the review and the rating, relative rating information, a favorite item at the entity, an expiration time for the review and the rating, one or more characteristics of one or more items at the entity, one or more characteristics of the subject of the review and the rating, and location information for the entity.

13. The method of claim 1, further comprising receiving, at the client device, an authoring tool for inserting the identifier tag and the rating tag into the document from the remote server system.

14. The method of claim 13, wherein the authoring tool is a program embedded in a web page and executable by a client computer.

15. The method of claim 13, wherein the providing receiving includes transmitting an authoring web page to the client device computer using a network, the authoring web tool being embedded in the authoring web page, and wherein the authoring tool is for composing the document.

16. The method of claim 15, wherein the authoring tool includes instructions for modifying the authoring web page to include a replica of the document.

17. A method of processing documents, comprising:
at a server system having one or more processors and memory storing programs executed by the one or more processors:
receiving a document in a search engine crawler, the document having an identifier tag and a rating tag embedded in the document, wherein the document is written in a markup language and the document was modified by a user of a client device remotely located from the server system using an authoring tool in the document by embedding the identifier tag and the rating tag into the document, respectively, and the identifier tag includes a review transmitted from the user and an identifier associated with an entity, distinct from the document, that is a subject of the review, and the rating tag includes a rating value from the user, the rating value corresponding to a user-selected rating of the entity that is the subject of the review;
importing the review, the identifier and the rating value from the document;
aggregating the review and the rating value with information in a repository that includes a plurality of reviews, identifiers and rating values from one or more sources to produce aggregated reviews and rating values; and
in response to a search query from the client device, returning to the client device an ordered list of search results including a search result corresponding to the document, wherein the search result's position in the ordered list is determined at least in part by a ranking value of the document that is determined in accordance with the review in the identifier tag and the rating value in the rating tag.

18. The method of claim 17, further comprising adjusting a weight associated with at least one of the identifier tag and the rating tag.

19. The method of claim 18, further comprising computing one or more document ranking values for one or more document locations, wherein the computing is performed in accordance with the weight associated with at least one of the identifier tag and the rating tag.

20. A computer-program product, comprising:
a non-transitory computer readable storage medium and a computer program mechanism embedded therein for execution by one or more processors in a client device, the computer program mechanism comprising:
instructions for receiving a document including an authoring tool from a remote server system and displaying the document and the authoring tool to a user, wherein the document is written in a markup language;
instructions for, in response to user actions, modifying the document using the authoring tool by performing at least the following two operations:
embedding an identifier tag in the document in response to a first user action, wherein the identifier tag includes a review from a user of the client device and an identifier associated with an entity, distinct from the document, that is a subject of the review; and
embedding a rating tag in the document in response to a second user action, wherein the rating tag includes a rating value from the user, the rating value corresponding to a user-selected rating of the entity that is the subject of the review;
instructions for transmitting the document including the embedded identifier tag and the embedded rating tag from the client device to a remote server system from which the document was received;
instructions for submitting a search query to the remote server system; and
instructions for receiving from the remote server system an ordered list of search results including a search result corresponding to the document, wherein the search result's position in the ordered list is determined at least in part by a ranking value of the document that is determined in accordance with the review in the identifier tag and the rating value in the rating tag.

21. A client device, comprising:
one or more processors;
memory storing one or more programs executed by the one or more processors, the one of more programs including:
instructions for receiving a document including an authoring tool from a remote server system and displaying the document and the authoring tool to a user, wherein the document is written in a markup language;
instructions for, in response to user actions, modifying the document using the authoring tool by performing at least the following two operations:
embedding an identifier tag in the document in response to a first user action, wherein the identifier tag includes a review from a user of the client device and an identifier associated with an entity, distinct from the document, that is a subject of the review; and
embedding a rating tag in the document in response to a second user action, wherein the rating tag includes a rating value from the user, the rating value corresponding to a user-selected rating of the entity that is the subject of the review;
instructions for transmitting the document including the embedded identifier tag and the embedded rating tag from the client device to a remote server system from which the document was received;
instructions for submitting a search query to the remote server system; and
instructions for receiving from the remote server system an ordered list of search results including a search result corresponding to the document, wherein the search result's position in the ordered list is determined at least in part by a ranking value of the document that is determined in accordance with the review in the identifier tag and the rating value in the rating tag.

22. A client device, comprising:
a memory means;
a processor means; and a program means, stored in the memory means and executed by the processor means, the program means including:
  instructions for receiving a document including an authoring tool from a remote server system and displaying the document and the authoring tool to a user, wherein the document is written in a markup language;
  instructions for, in response to user actions, modifying the document using the authoring tool by performing at least the following two operations:
  embedding an identifier tag in the document in response to a first user action, wherein the identifier tag includes a review from a user of the client device and an identifier associated with an entity, distinct from the document, that is a subject of the review; and
  instructions for embedding a rating tag in the document in response to a second user action, wherein the rating tag includes a rating value from the user, the rating value corresponding to a user-selected rating of the entity that is the subject of the review;
  instructions for transmitting the document including at least one of the embedded identifier tag and the embedded rating tag from the client device to a remote server system from which the document was received;
  instructions for submitting a search query to the remote server system; and
  instructions for receiving from the remote server system an ordered list of search results including a search result corresponding to the document, wherein the search result's position in the ordered list is determined at least in part by a ranking value of the document that is determined in accordance with the review in the identifier tag and the rating value in the rating tag.

23. A computer-program product, comprising:
a non-transitory computer readable storage medium and a computer program mechanism embedded therein for execution by one or more processors in a client device, the computer program mechanism comprising:
  instructions for receiving a document including an authoring tool from a remote server system and displaying the document and the authoring tool to a user, wherein the document is written in a markup language;
  instructions for, in response to user actions, modifying the document using the authoring tool by performing at least the following two operations:
  generating an identifier tag in the document in response to a first user action, wherein the identifier tag includes a review from a user of the client device and an identifier associated with an entity, distinct from the document, that is a subject of the review; and
  generating a rating tag in the document, wherein the rating tag includes a rating value from the user, the rating value corresponding to a user-selected rating of the entity that is the subject of the review;
  instructions for transmitting the document including at least one of the embedded identifier tag and the embedded rating tag from the client device to a remote server system from which the document was received;
  instructions for submitting a search query to the remote server system; and
  instructions for receiving from the remote server system an ordered list of search results including a search result corresponding to the document, wherein the search result's position in the ordered list is determined at least in part by a ranking value of the document that is determined in accordance with the review in the identifier tag and the rating value in the rating tag.

24. The method of claim 1, further comprising encrypting at least one of the review and the rating value before providing the document to the remote server system so as to prevent viewing of the encrypted review or rating value when the document is subsequently rendered at a respective client device.

25. The method of claim 17, wherein at least one of the review and the rating value is encrypted in the document received by the search engine crawler so as to prevent viewing of the encrypted review or rating value when the document is subsequently rendered at a respective client device.

* * * * *

UNITED STATES PATENT AND TRADEMARK OFFICE
CERTIFICATE OF CORRECTION

PATENT NO.        : 8,438,469 B1
APPLICATION NO.   : 11/241692
DATED             : May 7, 2013
INVENTOR(S)       : Scott et al.

It is certified that error appears in the above-identified patent and that said Letters Patent is hereby corrected as shown below:

In the Claims:

In column 15, line 8, please delete "providing".

Signed and Sealed this
Twenty-fifth Day of June, 2013

Teresa Stanek Rea
*Acting Director of the United States Patent and Trademark Office*